W. ZETZMAN.
WEEDING DEVICE.
APPLICATION FILED MAY 31, 1919.
1,343,805.
Patented June 15, 1920.
2 SHEETS—SHEET 1.
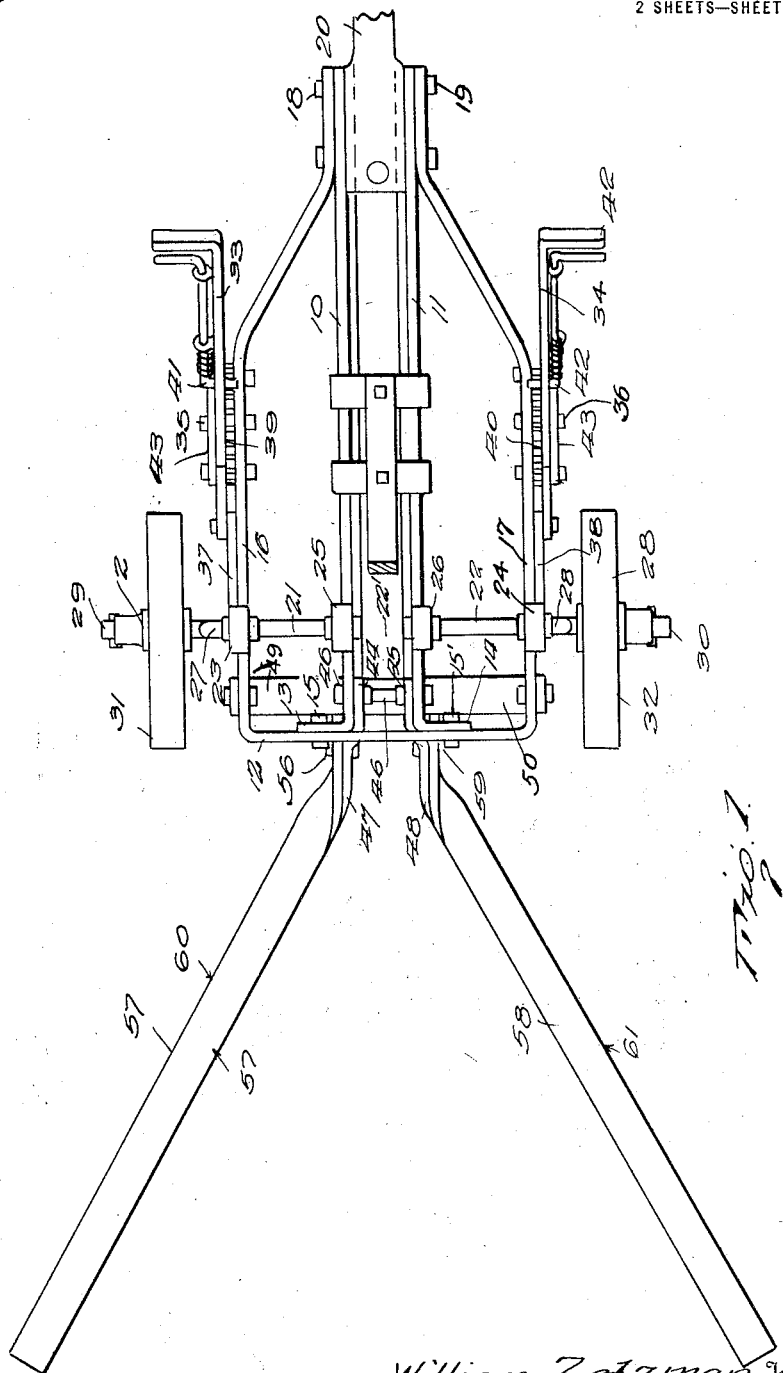
William Zetzman, Inventor
By Geo. P. Kimmel
Attorney

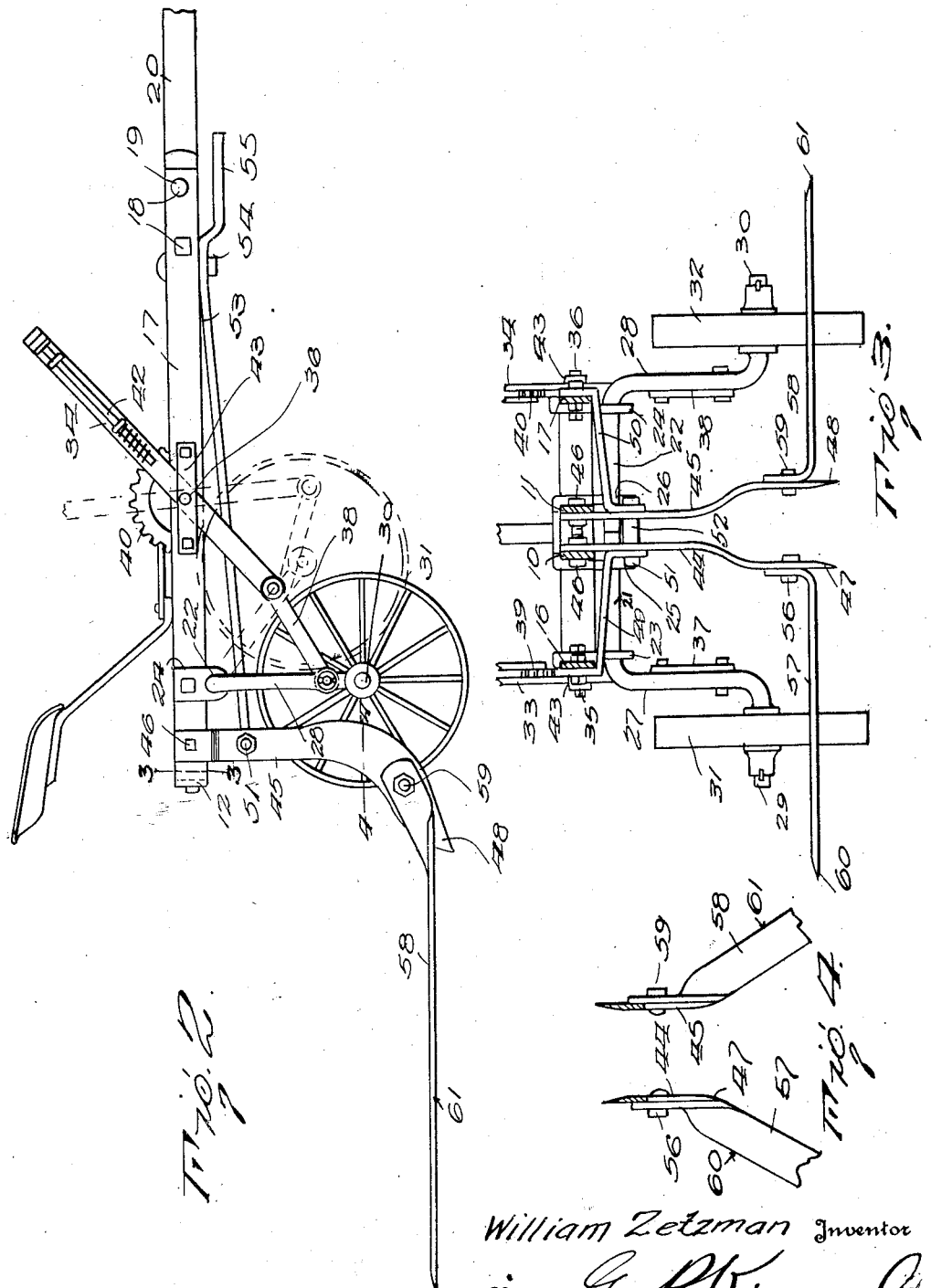

UNITED STATES PATENT OFFICE.

WILLIAM ZETZMAN, OF POST, TEXAS.

WEEDING DEVICE.

1,343,805.  Specification of Letters Patent.  Patented June 15, 1920.

Application filed May 31, 1919. Serial No. 300,964.

*To all whom it may concern:*

Be it known that I, WILLIAM ZETZMAN, a citizen of the United States, residing at Post, in the county of Garza and State of Texas, have invented certain new and useful Improvements in Weeding Devices, of which the following is a specification.

This invention relates to horse or motor drawn weeding devices, and has for one of its objects to improve the construction and increase the efficiency and utility of devices of this character.

Another object of the invention is to provide a device of this character capable of operation above the ground, level with the ground, or beneath the surface of the ground as may be required.

Another object of the invention is to provide a device of this character including vertically directed root and runner cutting blades and coacting horizontally arranged weed cutting blades, and means for adjusting the blades to enable them to operate at different levels.

With these and other objects in view the invention consists in certain novel features of construction as hereafter shown and described and then specifically pointed out in the claims, and in the drawings illustrative of the preferred embodiment of the invention, Figure 1 is a plan view of the improved device, Fig. 2 is a side elevation with the nigh wheel detached, Fig. 3 is a rear elevation with the frame in section on the line 3—3 of Fig. 2, and Fig. 4 is a detail of portions of the cutting blades in section on the line 4—4 of Fig. 2.

The improved device includes a supporting frame formed with intermediate longitudinally directed members 10—11 in spaced relation, an outer frame formed with a rear member 12 coupled to the members 10—11 by out-turned terminals 13—14 secured to the member 12 by bolts 15—15'. The outer frame likewise includes side portions 16—17 converging toward their forward ends and united to the forward ends of the members 10—11 as illustrated at 18—19. The draft tongue 20 is coupled between the members 10—11 by the same fastening devices 18—19 which secure the members 16—17.

The axle portion of the improved device is formed in coacting sections in crank shape with the upper horizontal portions 21—22 abutting end to end and mounted for rotation by bearings 23—24 connected to the members 16—17 and by bearings or hangers 25—26 attached to the members 10—11 as shown. The depending outer portions 27—28 of the crank members are provided with the outstanding journals 29—30 to support the bearing wheels 31—32. Operating levers 33—34 are pivoted respectively at 35—36 to the outer members 16—17, and coupled at their lower ends respectively to the down turned portions 27—28 of the axles by links 37—38. By this arrangement it will be obvious that when the levers 33—34 are actuated the crank axles will be rotated in their bearings to elevate or depress the bearing wheels 31—32, to adapt the device to the ground over which it travels or to condition of the soil, as hereafter described.

Notched segments 39—40 are attached to the members 16—17 while the levers 33—34 are provided with the usual pawl devices 41—42 coacting with the notched segments to hold the levers and the wheels in adjusted position.

The pivot members 35—36 are supported by brace plates 43, as shown.

Standards 44 and 45, bear at their upper ends against the inner or confronting faces of the members 10—11, and are secured thereto by a single bolt 46. The standard members 44—45 are thus disposed in spaced relation, and are spaced at a greater distance at their lower ends, as shown in Figs. 1 and 3. At its lower end the standard 44 is directed rearwardly and terminates in a cutting point 47, while the standard 45 is likewise provided with a cutting point 48. The standard members are curved rearwardly, and the forward edges of the curved portions are knife edged, as illustrated in Fig. 4.

The standard 44 is braced from the member 16 as shown at 49, while the standard 45 is similarly braced from the member 17 as represented at 50. At their inner ends the members 49—50 are connected by a single bolt 51 which passes through the standards and is provided with a spacer member 52 between the members 44 and 45. Extending from the spacer member forwardly is a relatively long brace 53 the latter being secured near its forward end by a bolt 54 to the rear end of the tongue 20. The brace 53 is continued forwardly to form a keeper 55 for the shaft equalizer.

The bolt 51 is spaced some distance below the lower line of the members 10—11, so that the brace 53 acts as a support to the standards 44—45 as represented in Fig. 2.

Connected at 56 to the standard 44 is a cutter blade 57, while a similar cutter blade 58 is connected at 59 to the standard 45. The blades 57 and 58 extend rearwardly of the machine and diverge as represented in Fig. 1 and with their outer edges 60—61 sharpened to enable them to cut through the weeds as the machine is drawn forwardly. By diverging the members 57—58 as shown the swath or width of the cut is very materially increased so that the machine is enabled to cover a wide section of the ground.

By adjusting the wheels 31—32 by the action of the levers 33—34 the position of the cutting blades 57—58 relatively to the surface of the ground may be adjusted to any required extent. By adjusting the wheels 31—32 as shown by full lines in Fig. 2, the blades 44—45 and 57—58 may be elevated clear of the ground to enable the machine to be drawn from place to place when not in use, or employed to cut weeds at any required distance above the ground, and by adjusting the wheels to their highest point as shown by dotted lines in Fig. 2 the cutter members may be caused to operate beneath the surface of the ground, and thus sever weeds at any required depth. The machine is thus adapted to weeds of various kinds and may be thus adapted for various purposes as will be obvious.

The improved apparatus is constructed entirely of metal, and generally of commercial shapes so that the minimum of machine work is required to construct the device.

The improved device is more specifically intended for use in removing weeds in the neighborhood of growing plants and may be employed for cutting the weeds above the ground, or severing the roots of certain weeds below the ground, and at the same time cultivating the soil in the neighborhood of the growing plants.

If required the obliquely directed blades 57—58 may be detached and the cutting edges of the standards 44—45 utilized to sever the laterally growing roots and runners of plants.

If only one of the blades 57 or 58 be required, as when cutting weeds and the like at one side only, the fastening bolt of the unrequired blade may be loosened and the loosened blade turned into vertical position, or in inoperative position.

Having thus described the invention what is claimed as new is.

1. In an implement of the class described including a frame adapted to support a draft appliance, standards attached to said frame and having forwardly directed cutting edges, and cutting blades attached to said standards and spaced above their lower ends.

2. In an implement of the class described including a frame adapted to support a draft appliance, vertically disposed standards attached to said frame and having forwardly directed cutting edges, and cutting blades attached to said standards and spaced above their lower ends, said cutting blades being directed laterally and rearwardly of the standards, and operating above the lower lines of the same.

3. In an implement of the class described comprising a frame including intermediate longitudinal members in spaced relation, a draft tongue secured between said intermediate members at their forward ends, depending standards respectively attached to said longitudinal members at their rear ends and carrying rearwardly directed cutter blades, and a brace member connected at one end relatively to the forward ends of the longitudinal members and to the standards below their connection with the longitudinal members.

In testimony whereof I affix my signature hereto.

WILLIAM ZETZMAN.